United States Patent [19]
Binnig et al.

[11] 3,781,627
[45] Dec. 25, 1973

[54] DIGITAL MULTIPLEX SERVO CONTROL

[76] Inventors: Hurst Binnig, Kleistweg 43, Delmenhorst; Jürgen Freyen, Hinter den Hofen 52, Kirchweyhe; Dirk-Friedrich Middelmann, Hordestrasse 6, Schwerte, all of Germany

[22] Filed: June 26, 1972

[21] Appl. No.: 265,968

[30] Foreign Application Priority Data
July 14, 1971 Germany.................. P 21 35 045.8

[52] U.S. Cl.................. 318/562, 244/77, 318/600
[51] Int. Cl. .......................................... G05b 11/32
[58] Field of Search.................. 318/562, 600-604; 244/77

[56] References Cited
UNITED STATES PATENTS

| | | |
|---|---|---|
| 2,877,398 | 3/1959 | Gimpel et al. .................... 318/562 |
| 3,105,927 | 10/1963 | Flatten et al...................... 318/562 |
| 3,526,757 | 9/1970 | Rees et al. ..................... 318/562 X |
| 3,564,377 | 2/1971 | Evans et al. ....................... 318/562 |
| 3,626,385 | 12/1971 | Bouman........................ 318/562 X |
| 3,641,326 | 2/1972 | Harte............................. 318/562 X |
| 3,676,598 | 7/1972 | Kurta .......................... 318/562 UX |
| 3,681,773 | 8/1972 | Russell........................... 318/562 X |

Primary Examiner—T. E. Lynch
Attorney—Ralf H. Siegemund

[57] ABSTRACT

A digital controller with a single multiplexor handling inputting of controlled variables, commands and modifier signals, further handling the output-to-input data circulation of ALU-accumulator unit, and the output of actuator control signals.

4 Claims, 1 Drawing Figure

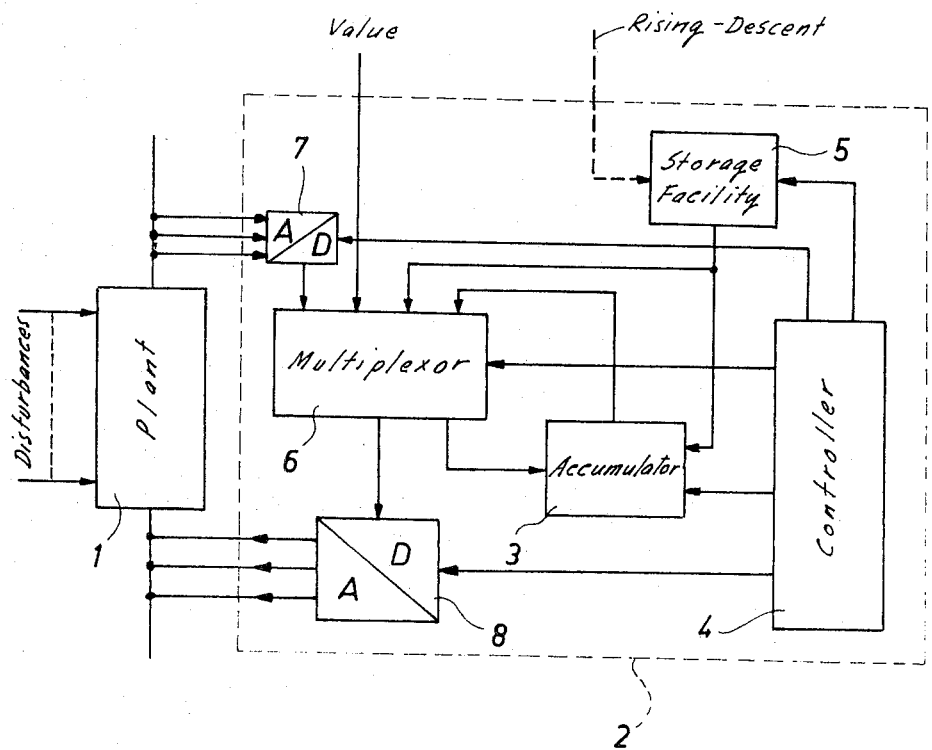

DIGITAL MULTIPLEX SERVO CONTROL

BACKGROUND OF THE INVENTION

The present invention relates to improvement in apparatus for digital control and regulation, wherein the quantity to be controlled is sampled at a particular rate and wherein a control signal for an actuator is calculated by means of digital processing of the sampled values, so that the controlled quantity follows a particular command input.

Digital controllers operate in accordance with several different principles, each of which is usually used in particular types of applications. In accordance with one of these methods also called "pulse counting method," the pulses of separately provided trains are counted within a particular acquisition period, whereby these pulse trains represent command value or the control variable. An error signal is then formed from the difference in counting results for these two different pulse trains. It can, therefore, be seen that resolution of the control process as far as response speed is concerned (frequency response), depends generally upon the control variable itself, as well as upon the speed of the counter.

Usually, the proportionate operating component of such a regulator is developed directly from the error signal, but it is often desirable to superimpose rate information as well as an error integration as separate component for a compound controller. The differentiated or rate component can be formed by using two sequentially ascertained proportional components, in forming a first order approximation for the differential quotient. That, of course, requires a running storage of the proportionate component as resulting from the previous sampling and acquisition period. This previously obtained component has to be subtracted from the present component by way of a caluculating operation followed by dividing this difference by the value of the acquisition period.

The integrated portion or component is usually obtained through a counting operation, summing the pulse trains as used for the proportioning component on a continuing basis. the counting result at the end of each counting period represents the integral component for the regulator.

This method has the disadvantage that the controller is quite expensive and operates rather slowly with a very limited degree of accuracy. A significant number of pulses is needed in order to obtain a meaningful result; the amplitude resolution of this method, of course, will deteriorate if the number of pulses processed in each step is very low. Moreover, this method is not suited for the realization of logic function, and non-linear control operations of a complex nature of the type needed, for example, for the control of aircraft, can hardly be realized successfully.

Another method for digital control is also called LOBIC which depends upon a special encoding of a physical quantity on the basis of a particular electric signal. In this method a longitudinally oriented code word is formed in such a manner that it can be stored in a bindery format, but such a code word is produced only upon processing of data and during transfer between storage facilities and registers. While the value of the encoded physical quantity in the storage facility as well as in the registers of the calculator is established in dual format. When encoded, the physical quantity is represented by a sequency of as many pulses, following each other, as needed to represent directly the magnitude in decimal format; i.e., the length of such a pulse sequence is proportional to the value of the encoded quantity. This property of code words permits calculating operations in a rather simple manner, because all calculating operations can be reduced to additions or subtractions. On the other hand, this advantage is offset by a very large period of time needed for obtaining the calculation. Moreover, these code words require additional bit positions for characterizing the sign of the quantity represented, so that, for example, in case of complex non-linear regulating operations, code words of a length of 30 bits are needed. Processing of such long words requires a fairly long period of time. Therefore, this method is applicable to rather simple control operations only and is not suited for the control of aircraft vehicles.

Another digital control method is known which is based on probability and is called the stochastic method. The probability is determined that a logic signal level in a sampled pulse sequence presents a "one." The value of the physical quantity to be represented or regulated, etc., is then represented by the ratio of the number of "one" levels to the number of processed clock bits. The conversion of a physical quantity into a STOCHASTIC pulse sequence is carried out by comparing this quantity with the output signal level of a random signal or noise generator, whereby the instantaneous logic level is determined as "1," whenever the output of the generator is smaller than the signal, and "zero" is when the noise level generator provides a larger output than the signal to be quantized.

This latter particular method is characterized by the fact that the particular disturbances, such as data drop-out, will no longer play an important role and will no longer deteriorate the performance because the probability is always based on averaging. This method, however, has the disadvantage that upon program changes difficulties arise concerning the correlation of signals, and the expenditure and complexity of the system increases considerable if the needed calculations are of a complex nature. This is so, because for each operation there must be provided a corresponding operating element. Therefore, again, this particular method is not suitable for carrying out logic functions and complex, non-linear regulations. Moreover, also this method is quite slow and limited in accuracy.

DESCRIPTION OF THE INVENTION

It is the object of the invention to avoid the difficulties mentioned above and to provide a new system for digital control on the basis of sampling the controlled variable whereby the system must be suitable to carry out control operations corresponding to linear, as well as non-linear relationships, at high speed and with sufficient accuracy. More particularly, it is an object of the present invention to provide digital control apparatus permitting complex calculations and operations as they are needed for the control of aircraft.

In accordance with the preferred embodiment of the present invention, it is suggested that the sampled controlled variable is fed to an accumulator, arithmetic logic unit, through a multiplexor, which receives also particular signal modifiers or coefficients as digital signals and held in a suitable storage facility. The modifiers are used for calculating the needed control signal whereby the particular coefficient that is fed to the accumulator depends upon the regulating characteristics desired and needed for the controller; the accumulator provides sequentially portions of the needed code signal within a sampling period, stores them temporarily, and as soon as all signal components needed for the output control, these portions are fed to the actuator via the multiplexor.

It is of advantage to provide a control unit in the regulator which controls the sampling of the controlled variable as well as the sequence of steps needed for calculating the required control signal on the basis of the acquired presentation of the controlled variable. Moreover, the control unit controls the data traffic through the multiplexor, whereby inputs as well as outputs are multiplexed.

Moreover, it is of advantage to provide a read-only memory type storage facility for the coefficients and modifiers to be stored. This has the advantage that these particular values and their limits are available in a non-destructive storage mode. The multiplexor which has the task to transmit the several digital signals, preferably in bi-value code for processing them in the particular sequence in the accumulator, will also serve to limit calculated intermediate values for the output control signal ultimately destined for the actuator. In this way, it can be made sure that the individual actuators are operated only within the particular permitted range.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates schematically a block diagram of an example of the preferred embodiment of the present invention.

DETAILED DESCRIPTION OF THE DRAWING

Proceeding now to the detailed description of the drawing, the FIGURE illustrates a particular digital feedback system for automatic control on basis of digital processing.

Reference numeral 1 refers to the plant such as a motor, hydraulic actuator or the like, that is being controlled, and reference numeral 2 denotes a block which encircles the several components of a digital controller inproved in accordance with the preferred embodiment of the present invention.

The digital controller 2 includes a combined accumulator arithmetic logic unit 3. This unit 3 may have plural facilities for processing arithmetically and/or logically signals fed to the ALU portion from addressable accumulator registers, serving as temporary storage facility for data input and output relative to the ALU. A control unit 4 provides for proper sequencing of the operation of the calculator. In addition, there is provided a storage facility 5, for example, in the form of a "read only" memory and containing a plurality of particular coefficients to be used as modifiers in the calculations needed to arrive at suitable actuator control signals.

A multiplexor 6 is controlled from the control unit 4, as far as the multiplexing operation is concerned, and it has a plurality of inputs as well as outputs. The multiplexor 6 multiplexes the several inputs and passes them to one or the other of two outputs in accordance with the operation of the control unit 4. Basically, three types of data transfers are handled through the multiplexor; (i) input data are fed to the accumulator-ALU; 3, (ii) data circulate from the output of the ALU to the input of the accumulator of the unit 3; (iii) calculated data are multiplexed out of the controller 2. The control unit 4 handles the data traffic through and by the multiplexor 6 (i) to organize the stepwise sampling and provided of needed inputs (ii) to obtain the needed calculations; and (iii) to cause the presentation of useful output signals to the plant, to obtain actuator operation therein so that the controlled variable(s) follow the desired value(s).

There is provided, accordingly, an analog to digital converter 7, having its input connected to the output of plant 1 for sampling one or several controlled variables, and providing their digitized output to one of the inputs of the multiplexor 6, and whenever so required by operation of the control unit 4. A corresponding digital to analog converter 8 receives digital signals from the unit 3 through multiplexor 6 in steps and as determined by the control unit 4. The analog outputs of converter 8 serve as output control signals for and in the controlled plant 1.

As stated above, the multiplexor 6 receives as one of its inputs the digital output of the A to D converter 7. A second input for the multiplexor leads to a source for the command value, provided separately and from a second storage or input facility for such command values. It is assumed in the present instant that the command value is presented in a digital format. A third input for the multiplexor is derived from the ROM 5, which is addressed in accordance with a stored controller 4. ROM 5 provides digital signals representing coefficients to that third input of the multiplexor whenever so required by the control unit 4. Finally, the multiplexor 6 receives, as already mentioned, the output of the ALU portion of unit 3. These are usually process result signals. These signals are either stored as intermediate results in the accumulator portion of unit 3, or they are presented as outputs to the input of the D/A converter 8.

It should be mentioned that the provision of two converters 7 and 8 is not essential in principle as the plant itself may provide for digital inputting and outputting but in the normal case such converters are required as usually plants to be regulated, inherently provide outputs and respond to inputs on an analog basis.

Another point to be considered is that the command value does not necessarily have to be fed as one input to the multiplexor 6. It may, for example, be of greater advantage to provide the ROM 5 with a facility or storage section which furnishes these command values in response to particular inputs. A preferred example for the invention is a regulator for the control of an aircraft. In such a case, the external command furnished to this regulator is not a quantity but only a command representing, e.g., "rising" or another command "descend." Such a command is the fed to the storage facility 5, and the facility 5 furnishes a particular command value or a train of command values, to be used in the digital equipment.

After the desired altitude has been reached, the command value then needed is for level or altitude control and will be provided by the ROM 5 in response to an input code when the desired level has been reached.

The operation of the digital control device is as follows: In the normal case, the desired variables are continuously sampled and compared with the command reference, either as furnished directly or as provided condition responsive by the ROM 5. The arithmetic unit will calculate an error signal, and, for example, tests whether the error is below a tolerance limit. If so, the controller will furnish invariable outputs to the D/A converter 8 so that the existing condition of the plant 1 is maintained.

As represented pictorially in the drawing, various disturbances are presumed to be effective on the plant. The plant may be an aircraft, and the disturbances are, for example, changes in level altitude, attitude, etc. In the general sense, a change in command input can likewise be regarded as a "disturbance." In either case, a deviation will occur as between the variable sampled or to be sampled and the desired value for that controlled value as represented by the currently valid command signal. The control unit 4 will, in effect, respond to a program branching condition when an error signal above the predetermined threshold has been detected, and now controller 4 causes the needed change in furnished output to be calculated. In particular, the sampled signals as applied to the A to D converter 7, i.e., the various sampled values of the controlled variable (s) are presented as digital signals at the output of the converter 7 and they are applied to that one input of the multiplexor 6. The multiplexor receives also the command value as it may have changed.

The control unit 4 causes multiplexor 6 to more or less simultaneously set command variable and controlled variables to the accumulator 3. Accumulator 3 is assumed to have at least two registers which receives these two different digital signals providing intermediate storage for these signals. Accumulator 3 is actually presumed to have a private register memory and in dependence upon the sequencing operation of control unit 4 one or several particular coefficient furnished from the ROM 5 to the accumulator. The coefficient or modifier to be used is determined by and dependent upon the condition and mode in which the controller is to operate, as a proportioning controller is a proportioning-integrating (reset) controller or as a proportioning controller with superimposed derivative component, or as a three-set controller having proportionate, reset and rate components. Also, the coefficient (s) will determine whether or not the controller is to run on a non-linear basis. Again, such coefficient or coefficients are being fed to the particular storage facilities of the private memory of the accumulator 3.

The ALU portion in unit 3 is used to calculate particular signal components for a control signal and that calculation, of course, is sequenced by the control unit 4. The accumulator 3 operates in a loop configuration with the multiplexor 6, so that its private memory serve also as a storage facility for the various intermediate results and final results as they are being calculated. After all necessary signal components have been calculated, the loop, so to speak, is broken and the result or results as provided by the accumulator 3, are fed via the multiplexor 6 to the digital input of the digital to analog converter 8. The frequency of occurrence of this operation is, of course, determined also by the control unit 4. This is more or less a periodical occurrence, for updating the analog output provided permanently, for example, on a sample-and-hold basis as output of the D/A converter 8 and to the input of the plant 1.

The regulator device has significant advantages over the known digital controllers. One of the advantages is that one can employ the modular principle for realizing linear as well as non-linear control operations. Also, it is possible to use integrated circuit components which are very light and occupy very little space and, therefore, are readily suitable for inclusion in an aircraft. Moreover, it is of advantage to operate the controller on the basis of a program which is not storable but is hard wired stored, for example, in ROM-type memory, just as the coefficients are unalterably stored in the controller ROM 5. These data which are needed for proper operation, will always be available and are not subject to any disturbances.

In case of digital control, it is necessary to quantize the output signal of the plant 1 as input for the controller, but this does not necessarily mean quantizing in time. It just means formation of discrete values and sampling of such signals, provided discrete values of a steady physical quantity has advantage, particularly for obtaining operation in suitable format. For example, variations of the quantizing steps, such as varying the time $t$ in-between two sampling periods, permits control of phase and amplitude of a transfer function within the system. The working with discrete values together with a variation of the coefficients made available to the ALU permits the realization of different algorithms in the control operation, for example, by means of a transfer channel, operating in time multiplex or on a time-sharing basis. Again, this means a reduction in the required space, as well as a reduction in weight and expenditure while technical reliability is increased accordingly.

If the ALU of unit 3 operates sufficiently fast, the scanning rate or sampling rate for the controlled variable can be quite small and actually can be made smaller than theoretically required, on basis of the stability and scanning requirements, and as far as a minimum period of time for stable operation is concerned. Accordingly, a sufficiently fast operating ALU may also use data redundancy of fast sampled inputs which is a safety factor against static disturbances.

Bi-valued codes are used for signal transmission as well as for signal processing, so that expenditure for representation, storage and processing of information is quite minimal because the bi-valued code per se is not redundant; moreover, the binary operation permits employment of packaged standardized components, so that the realization of the controller is not complicated at all.

The utilization of bi-valued bits permits also direct matching of the controller components to a process controller or large computer facility. Therefore, fast transmission of information to the controller is possible, which is particularly important in case of aircraft control. Up to the time right before take-off, information can still be fed to the on-board calculating unit so up to the very last moment, the airport computing facilities can be used for testing maintenance. It will also be noted that plural facilities may operate in parallel so that different output signal components are separately calculated and assembled. There may be different coefficient ROM's, one for holding data needed for ascertaining the rate component, one for ascertaining the reset signal etc.

The invention is not limited to the embodiments described above but all changes and modifications thereof not constituting departures from the spirit and scope of the invention are intended to be included.

We claim:

1. Apparatus for digitally controlling an actuator for an airfoil or the like in an aircraft, comprising:
   first means for sampling the value of the controlled variable at a particular rate;
   an arithmetic unit with accumulator and additional storage facilities;
   digital multiplexing means having input and output respectively connected to output and input of said unit for handling the digital data flow from and to said unit;
   program-controlled means providing control signals for operating the multiplexing means for obtaining data transfer through the unit and for processing data held in the storage facility and for storing the processed data in the storage facility, the control means further providing control signals for operating the multiplexing means for feeding said sampled values to the unit, the multiplexing means having its input connected to the first means;
   a storage means holding signals representing particular modifiers including particular reference and command signals provided in response to rising and descend commands when received as inputs, the storage means further including coefficient, determining the transfer characteristics of the control operation, the multiplexing means having its input connected to the storage means, the control means operating the multiplexing means for transfer of signals to the unit;
   the control means providing control signals to the arithmetic unit for causing the arithmetic unit to compose output control signals from the signals in the storage means and from the sampled values including the calculation of error signals and of correction signals in accordance with the coefficients stored in the storage means; and
   output means for providing output control signals to the plant and having its input connected to the output of the multiplexing means, the control means operating the multiplexing means to feed output signals to the output means.

2. Apparatus as in claim 1, wherein the control means includes a read-only memory for providing the several control signals for operating the multiplexing means, the arithmetic unit and the access and read-out of the storage means.

3. Apparatus as in claim 1, the multiplexor including means for limiting the format of signals as transferred through it.

4. Apparatus as in claim 1, including means for causing the storage means to provide reference and command signals to the input of the multiplexing means.

* * * * *

UNITED STATES PATENT OFFICE
CERTIFICATE OF CORRECTION

Patent No. 3,781,627　　　Dated December 25, 1973

Inventor(s) HORST BINNING, ET. AL.

It is certified that error appears in the above-identified patent and that said Letters Patent are hereby corrected as shown below:

On the cover sheet, insert -- [73] Assignee: Vereinigte Flugtechnische Werke-Fokker Gesellschaft mit beschrankter Haftung, Bremen, Germany, a corporation of Germany -- .

Signed and sealed this 6th day of August 1974.

(SEAL)
Attest:

McCOY M. GIBSON, JR.
Attesting Officer

C. MARSHALL DANN
Commissioner of Patents